(12) United States Patent
Bulloch

(10) Patent No.: US 8,021,254 B2
(45) Date of Patent: Sep. 20, 2011

(54) VARIABLE LEAKDOWN CHAIN DRIVE TENSIONER

(75) Inventor: Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 12/178,698

(22) Filed: Jul. 24, 2008

(65) Prior Publication Data

US 2010/0022337 A1    Jan. 28, 2010

(51) Int. Cl.
*F16H 7/08*    (2006.01)

(52) U.S. Cl. .................... 474/109; 474/111; 474/122

(58) Field of Classification Search .............. 474/109, 474/110, 111, 122
See application file for complete search history.

(56) References Cited

U.S. PATENT DOCUMENTS

| | | | | |
|---|---|---|---|---|
| 4,911,679 A | * | 3/1990 | Inoue et al. | 474/110 |
| 4,986,796 A | * | 1/1991 | Kawashima et al. | 474/101 |
| 5,073,150 A | * | 12/1991 | Shimaya | 474/110 |
| 5,181,889 A | * | 1/1993 | Maruyama et al. | 474/110 |
| 5,234,383 A | * | 8/1993 | Harada et al. | 474/110 |
| 5,304,099 A | * | 4/1994 | Deppe et al. | 474/110 |
| 5,366,415 A | * | 11/1994 | Church et al. | 474/110 |
| 5,577,970 A | * | 11/1996 | Smith et al. | 474/110 |
| 5,601,505 A | * | 2/1997 | Tada | 474/110 |
| 5,653,651 A | * | 8/1997 | Kawashima et al. | 474/110 |
| 5,879,256 A | * | 3/1999 | Tada | 474/110 |
| 5,908,363 A | * | 6/1999 | Suzuki | 474/101 |
| 5,913,742 A | * | 6/1999 | Nakamura et al. | 474/110 |
| 6,196,939 B1 | * | 3/2001 | Simpson | 474/110 |
| 6,203,461 B1 | * | 3/2001 | Watanabe et al. | 474/110 |
| 6,244,981 B1 | * | 6/2001 | Simpson | 474/110 |
| 6,746,352 B1 | * | 6/2004 | Poiret et al. | 474/110 |
| 6,866,601 B2 | * | 3/2005 | Saitoh et al. | 474/109 |
| 2007/0072713 A1 | * | 3/2007 | Slopsema et al. | 474/101 |

* cited by examiner

*Primary Examiner* — Emmanu M Marcelo
(74) *Attorney, Agent, or Firm* — Quinn Law Group, PLLC

(57) ABSTRACT

A variable leakdown chain drive tensioner system includes a chain drive tensioner in operable communication with a chain. The chain drive tensioner includes a tensioner body with at least one leakage hole defining a first leakdown path and a tensioner piston assembly in operable engagement with the tensioner body. As the chain wears, the tensioner piston assembly is moveable from a first position, allowing flow through the first leakdown path, to at least a second position, substantially blocking flow through the first leakdown path. The tensioner body may also include a second leakage hole defining a second leakdown path and the tensioner piston may also have a third position. The first position would allow flow through the first and second leakdown paths, the second position would allow flow through only the second leakdown path, and the third position would substantially block flow through both the first and second leakdown paths.

19 Claims, 2 Drawing Sheets

VARIABLE LEAKDOWN CHAIN DRIVE TENSIONER

TECHNICAL FIELD

This invention relates generally to chain drive tensioners and, more particularly, to a variable leakdown chain drive tensioner, in which the leakdown is reduced to increase tensioner reaction stiffness as the tensioner chain wears.

BACKGROUND OF THE INVENTION

Chain drive systems are used to operate ancillary components associated with automotive engines. For example, chain drive systems are used to drive complex valve trains, balance shafts, oil pumps, high pressure fuel injection pumps and water pumps.

Known chain drive systems include a chain and a chain drive tensioner system that is operable to create an initial required tension on the chain. However, over time, as the chain of the chain drive system wears, slack is generated in the chain drive system. As the chain wears, it is the chain drive tensioner system that is operable to remove the slack from the system.

Known chain drive tensioner systems generally include a tensioner body and a tensioner piston attached to a shoe. Oil pressure generated within the tensioner body, exerts pressure against the tensioner piston and shoe assembly, which engages the chain to create the required tension. As the chain wears, the tensioner piston extends to remove the slack from the system. However, as the tensioner piston extends, the leverage the chain has on the chain tensioner system increases effectively reducing the chain tensioner system's ability to control the chain drive.

In one known chain drive tensioner system, the tensioner body includes an orifice of a fixed size, which allows for a fixed leakdown of oil pressure within the chain drive tensioner system to control the reaction stiffness of the chain drive tensioner as the chain wears. However, because the leakdown of this system is fixed, the stiffness of the chain tensioner system remains constant throughout the extension range of the tensioner piston while the leverage the chain has on the chain tensioner system increases.

SUMMARY OF THE INVENTION

A variable leakdown chain drive tensioner system is disclosed. The variable leakdown chain drive tensioner system includes a chain drive tensioner in operable communication with a chain. The chain drive tensioner includes a tensioner body with at least one leakage hole defining a first leakdown path and a tensioner piston assembly in operable engagement with the tensioner body. The tensioner piston assembly is moveable from a first position, allowing flow through the first leakdown path, to at least a second position, substantially blocking flow through the first leakdown path, as the chain wears.

The variable leakdown chain drive tensioner system includes a tensioner piston assembly and a tensioner body. The tensioner piston assembly includes a tensioner piston portion and a tensioner shoe portion. The tensioner piston portion includes a first diameter and a second diameter. The second diameter defines a groove having a piston leakage hole that is in fluid communication with the at least one leakage hole when the tensioner piston assembly is in the first position. The first diameter, which is larger than the second diameter, substantially blocks fluid communication to the at least one leakage hole when the tensioner piston assembly is in the second position.

In an alternate embodiment, the tensioner body may include a second leakage hole defining a second leakdown path and the tensioner piston may have a third position, wherein the first position allows flow through the first leakdown path and the second leakdown path, the second position allows flow through only the second leakdown path, and the third position substantially blocks flow through both the first leakdown path and the second leakdown path.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
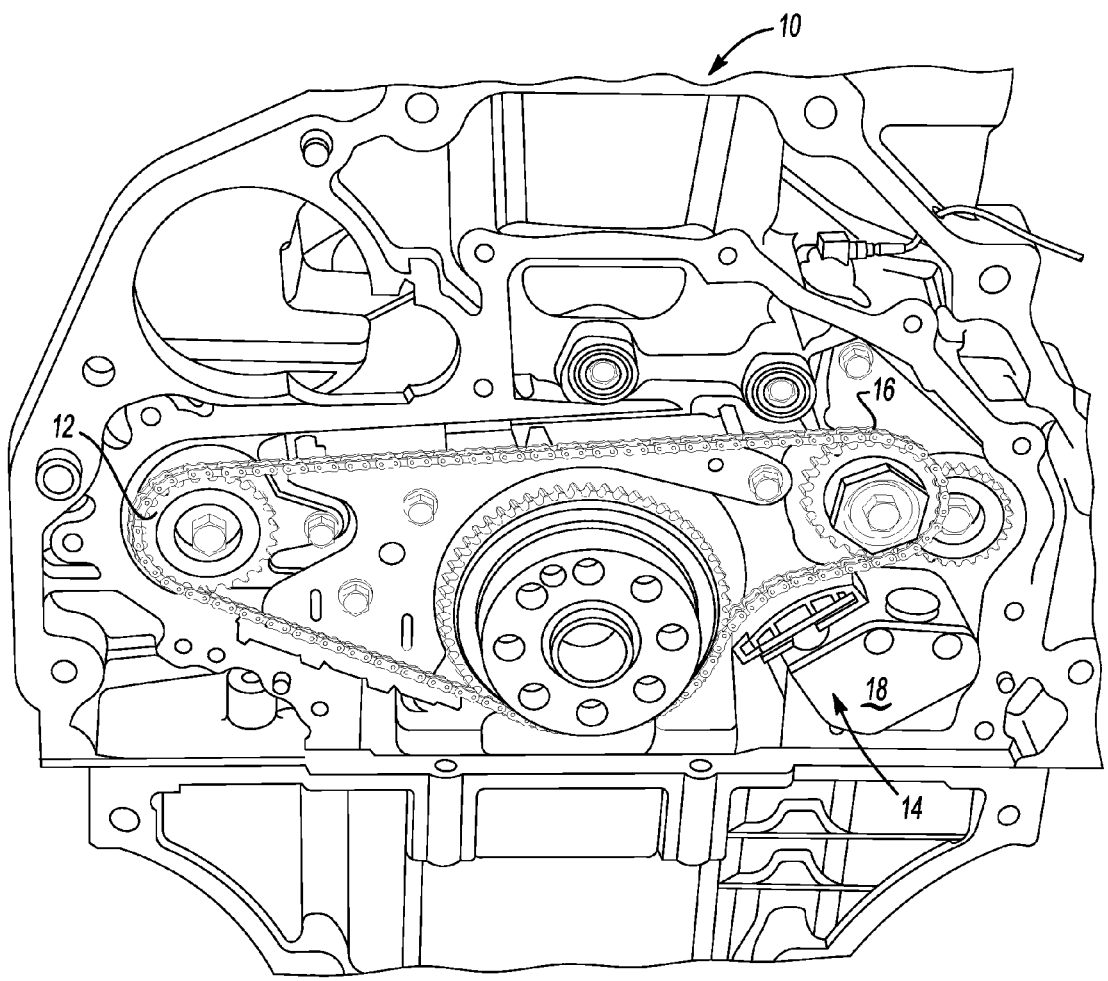
FIG. 1 is a schematic perspective illustration of an internal combustion engine with a chain driven balance shaft drive including a variable leakdown chain drive tensioner assembly according to one embodiment of the present invention.

Referring to the drawings, wherein like reference numbers refer to like components, FIG. 1 is a schematic perspective illustration of an internal combustion engine 10 with a chain driven balance shaft drive, indicated generally at 12.

A variable leakdown chain drive tensioner assembly 14 tensions a drive chain 16 of the chain driven balance shaft drive 12. The variable leakdown chain drive tensioner 14 includes a tensioner body 18 and tensioner piston assembly 20 in contact with the drive chain 16.

It should be appreciated that, while the variable leakdown chain drive tensioner assembly 14 is applied to the chain driven balance shaft drive 12, the variable leakdown chain drive tensioner assembly 14 may alternatively be applied to other chain driven systems, which may include but are not limited to, chain drive systems used to drive complex valve trains, oil pumps, high pressure fuel injection pumps and water pumps.

Figure 2:
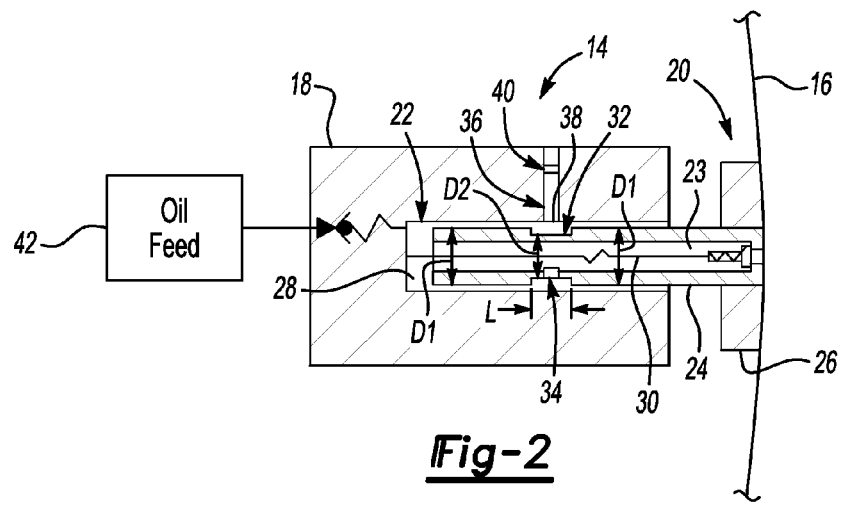
FIG. 2 is a schematic illustration of the variable leakdown chain drive tensioner assembly of FIG. 1 tensioning a new chain.

FIG. 2 is a schematic illustration of the variable leakdown chain drive tensioner assembly 14 of FIG. 1 tensioning a new chain 16. The variable leakdown chain drive tensioner assembly 14 includes a tensioner body 18 defining a bore 22 and a tensioner piston assembly 20 having a tensioner piston portion 24 and a tensioner shoe portion 26.

The bore 22 and a tensioner piston cavity 23 of the tensioner piston assembly 20 cooperate to form a chamber 28, which, as discussed further below, is substantially fluid-tight and, when filled with fluid, is characterized by a hydraulic stiffness that substantially prevents inward movement of the tensioner piston assembly 20 when under loading by the chain 16.

The tensioner piston portion 24 of the tensioner piston assembly 20 is installed within the bore 22 of the tensioner body 18. A spring 30 connects the tensioner body 18 and the tensioner piston assembly 20.

The tensioner piston portion 24 is cylindrical and includes a first diameter portion $D_1$ and a second diameter portion $D_2$, which is smaller than the first diameter portion $D_1$. The second diameter portion $D_2$ extends along a length L of the tensioner piston portion 24 to create a groove 32 within the second diameter portion $D_2$ of the tensioner piston portion 24. A leakage hole 34 is disposed in the second diameter portion $D_2$ of the tensioner piston portion 24.

The tensioner body 18 includes a first leakage hole 36 in fluid communication with the chamber 28, which defines a first leakage path 38. A leakdown disk 40 is disposed within the first leakage path 38. The leakdown disk 40 is operable to regulate flow through the first leakage path 38 at a fixed flow rate based on pressure within the chamber 28.

Hydraulic fluid is received within the chamber 28 of the tensioner body 18 from an oil feed 42. When filled with hydraulic fluid, a hydraulic stiffness or tensioner reaction stiffness, is created within the chamber 28, which substantially prevents inward movement of the tensioner piston assembly 20 when under loading by the chain 16.

When the chain 16 is a new chain, as illustrated in FIG. 2, the tensioner piston assembly 20 is in a first position wherein the groove 32, including the leakage hole 34, is in fluid communication with the first leakage path 38 disposed in the tensioner body 18. In this first position, the hydraulic fluid within the chamber 28 can leak out from within the chamber 28 through the leakage hole 34 and into the first leakage path 38 where the flow exits at a fixed value as determined by the leakdown disk 40. As such, it is the leakage through the first leakage path 38 that controls the tensioner reaction stiffness. That is, as the leakage increases, the tensioner reaction stiffness decreases and, conversely, as the leakage decreases the tensioner reaction stiffness increases.

As the chain 16 wears, the chain 16 elongates creating slack in the chain 16. To accommodate for the slack in the chain 16, the variable leakdown chain driver tensioner assembly 14 must adjust to take up the slack in the chain 16.

Figure 3:
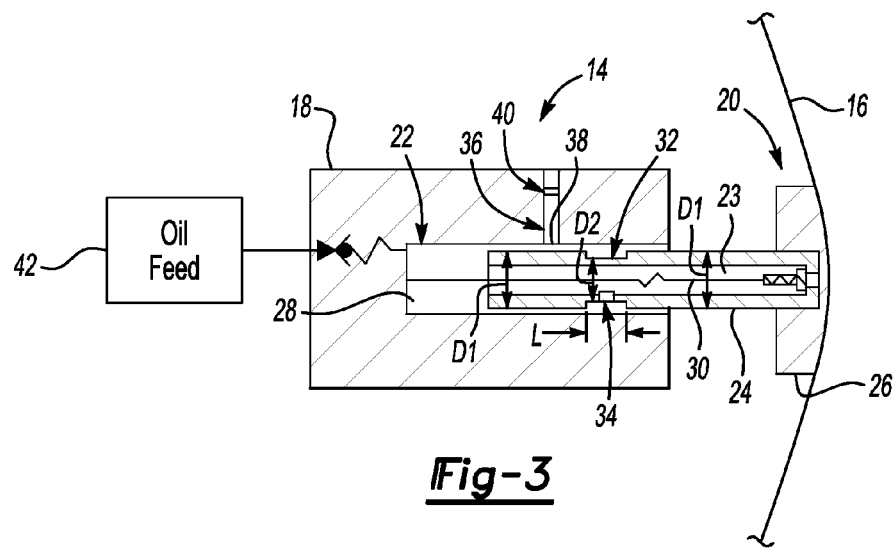
FIG. 3 is a schematic illustration of the variable leakdown chain drive tensioner assembly of FIG. 1 tensioning a worn chain.

FIG. 3 is a schematic illustration of the variable leakdown chain drive tensioner assembly 14 of FIG. 1 tensioning a worn chain. As the chain 16 wears, the tensioner piston assembly 20 of the variable leakdown chain drive tensioner assembly 14 extends outward from the tensioner body 18 to take up the slack in the chain 16.

As the tensioner piston assembly 20 moves outward from the tensioner body 18 to take up the slack in the chain 16, the leverage that the chain 16 has on the variable leakdown chain drive tensioner assembly 14 increases, which, in traditional known fixed leakdown chain drive tensioner assemblies, reduces the tensioner assembly's ability to control the chain drive system.

However, in the variable leakdown chain driver tensioner assembly 14 according to the present invention, as the tensioner piston assembly 20 extends outward from the tensioner body 18 to take up the slack in the chain 16, the groove 32 in the tensioner piston portion 24 of the tensioner piston assembly 20 moves to a second position in which the leakage from within the chamber 28 is blocked. That is, when the tensioner piston assembly 20 moves to the second position, the groove 32 including the leakage hole 34 is no longer in fluid communication with the first leakage path 38. As it is the leakage through the first leakage path 38 that controls the tensioner reaction stiffness, as discussed above, and that leakage is now eliminated, the tensioner reaction stiffness increases accordingly.

It should be appreciated that the variable leakdown chain drive tensioner assembly 14 of the present invention may include more than one leakage hole and that each leakage hole would respectively define a separate, individual leakage path. That is, several leakage holes and their respective leakage paths could be added such that as the tensioner piston assembly 20 extends outward from the tensioner body 18, additional leakage holes and their respective leakage paths become blocked effectively increasing the tensioner reaction stiffness, which results in an increasingly stiff tensioner.

Figure 4:
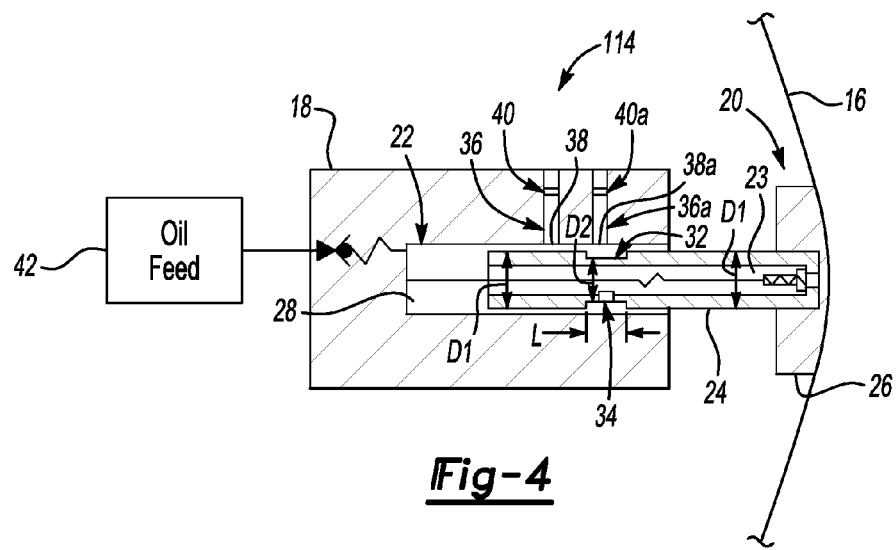
FIG. 4 is a schematic illustration of an alternate embodiment of the variable leakdown chain drive tensioner assembly of FIG. 1.

For example, as illustrated in FIG. 4, the variable leakdown chain drive tensioner assembly 114 includes a second leakage hole 36A that defines a second leakage path 38A.

In this example embodiment, the groove 32 including the leakage hole 34 would be in fluid communication with both the first leakage path 38 and the second leakage path 38A when the tensioner piston assembly 20 is in the first position, allowing leakage through both the first leakage path 38 and the second leakage path 38A.

As the chain 16 begins to wear, the tensioner piston assembly 20 extends outward from the tensioner body 18 to the second position. However, in this example embodiment, when the tensioner piston assembly 20 is in the second position, the groove 32 including the leakage hole 34 would only be in fluid communication with the second leakage path 38A and the flow through the first leakage path 38 is completely blocked, reducing the leakage and effectively increasing the tensioner reaction stiffness.

As the chain 16 continues to wear, the tensioner piston assembly 20 extends outward from the tensioner body 18 to yet a third position. When the tensioner piston assembly 20 is in the third position, not only is fluid communication between the groove 32 including the leakage hole 34 and the first leakage path 38 blocked, as in the second position, but fluid communication between the groove 32 including the leakage hole 34 and the second leakage path 38A is also completely blocked, reducing the leakage even further and effectively increasing the tensioner reaction stiffness even higher.

While the best modes for carrying out the invention have been described in detail, those familiar with the art to which this invention relates will recognize various alternative designs and embodiments for practicing the invention within the scope of the appended claims.

The invention claimed is:

1. A variable leakdown chain drive tensioner system comprising:
   a chain drive tensioner including:
      a tensioner body having at least one leakage hole defining a first leakdown path; and
      a tensioner piston assembly in operable engagement with the tensioner body, the tensioner piston assembly being moveable between:
         a first position allowing flow through the first leakdown path; and
         a second position substantially blocking flow through the first leakdown path.

2. The variable leakdown chain drive tensioner system as recited in claim 1, further including a chain, wherein the chain drive tensioner is in operable communication with the chain and the tensioner piston assembly moves from the first position to the second position as the chain wears.

3. The variable leakdown chain drive tensioner system as recited in claim 2, the tensioner body having a second leakage hole defining a second leakdown path and the tensioner piston having a third position, wherein the first position allows flow through the first leakdown path and the second leakdown path, the second position substantially blocks the flow through the first leakdown path and allows flow through only the second leakdown path, and the third position substantially blocks flow through both the first leakdown path and the second leakdown path.

4. The variable leakdown chain drive tensioner system as recited in claim 3, wherein the chain drive tensioner is operable to move from the second position to the third position as the chain wears.

5. The variable leakdown chain drive tensioner system as recited in claim 3, wherein the tensioner piston assembly includes a first diameter and a second diameter smaller than the first diameter, wherein the second diameter is in fluid communication with the second leakage hole when the tensioner piston is in the first position and wherein the first diameter substantially blocks fluid communication to the second leakage hole when the tensioner piston is in the third position.

6. The variable leakdown chain drive tensioner system as recited in claim 3, wherein the chain drive tensioner system has a first tensioner reaction stiffness when the tensioner piston is in the first position, a second tensioner reaction stiffness when the tensioner piston is in the second position, and a third tensioner reaction stiffness when the tensioner piston is in the third position, wherein the second tensioner reaction stiffness is greater than the first tensioner reaction stiffness and the third tensioner reaction stiffness is greater than the second tensioner reaction stiffness.

7. The variable leakdown chain drive tensioner system as recited in claim 3, further including a first leakdown disk disposed in the first leakdown path and a second leakdown disk disposed in the second leakdown path.

8. The variable leakdown chain drive tensioner system as recited in claim 1, wherein the tensioner piston assembly includes a first diameter and a second diameter smaller than the first diameter, wherein the second diameter is in fluid communication with the at least one leakage hole when the tensioner piston assembly is in the first position and wherein the first diameter substantially blocks fluid communication to the at least one leakage hole when the tensioner piston assembly is in the second position.

9. The variable leakdown chain drive tensioner system as recited in claim 8, wherein the second diameter defines a groove within the tensioner piston assembly and the groove includes a piston leakage hole.

10. The variable leakdown chain drive tensioner system as recited in claim 9, wherein the tensioner piston assembly includes a tensioner piston portion and a tensioner shoe portion.

11. The variable leakdown chain drive tensioner system as recited in claim 10, wherein the groove is disposed in the tensioner piston portion.

12. The variable leakdown chain drive tensioner system as recited in claim 9, wherein the groove is in fluid communication with the at least one leakage hole when the tensioner piston assembly is in the first position.

13. The variable leakdown chain drive tensioner system as recited in claim 9, wherein the groove is not in fluid communication with the at least one leakage hole when the tensioner piston assembly is in the second position.

14. The variable leakdown chain drive tensioner system as recited in claim 1, wherein the chain drive tensioner system has a first tensioner reaction stiffness when the tensioner piston assembly is in the first position and a second tensioner reaction stiffness, greater than the first tensioner reaction stiffness, when the tensioner piston assembly is in the second position.

15. The variable leakdown chain drive tensioner system as recited in claim 1, further including a leakdown disk disposed within the first leakdown path.

16. A variable leakdown chain drive tensioner system comprising:
a chain; and
a chain drive tensioner in operable communication with the chain, the chain drive tensioner having a first tensioner reaction stiffness when the chain is new and, wherein the chain drive tensioner is operable to increase the first tensioner reaction stiffness as the chain wears;
wherein the first tensioner reaction stiffness increases as a leakdown within the chain drive tensioner decreases.

17. An internal combustion engine in combination with a chain driven balance shaft drive including a variable leakdown chain drive tensioner system, wherein the variable leakdown chain drive tensioner system comprises:
a chain drive tensioner including:
a tensioner body having at least one leakage hole defining a first leakdown path; and
a tensioner piston assembly in operable engagement with the tensioner body, the tensioner piston assembly being moveable between:
a first position allowing flow through the first leakdown path; and
a second position substantially blocking flow through the first leakdown path.

18. The internal combustion engine as recited in claim 17, wherein the variable leakdown chain drive tensioner system further includes a chain, wherein the chain drive tensioner is in operable communication with the chain and the tensioner piston assembly moves from the first position to the second position as the chain wears.

19. The internal combustion engine as recited in claim 18, the tensioner body of the variable leakdown chain driver tensioner system having a second leakage hole defining a second leakdown path and the tensioner piston having a third position, wherein the first position allows flow through the first leakdown path and the second leakdown path, the second position substantially blocks the flow through the first leakdown path and allows flow through only the second leakdown path, and the third position substantially blocks flow through both the first leakdown path and the second leakdown path.

* * * * *